United States Patent
Zach

(10) Patent No.: US 10,877,472 B2
(45) Date of Patent: *Dec. 29, 2020

(54) FLIGHT MANAGEMENT SYSTEM FOR UAVS

(71) Applicant: LogiCom & Wireless Ltd., Hod Hasharon (IL)

(72) Inventor: Moshe Zach, Hod Hasharon (IL)

(*) Notice: Subject to any disclaimer, the term of this patent is extended or adjusted under 35 U.S.C. 154(b) by 37 days.

This patent is subject to a terminal disclaimer.

(21) Appl. No.: 16/451,172

(22) Filed: Jun. 25, 2019

(65) Prior Publication Data

US 2020/0033848 A1 Jan. 30, 2020

Related U.S. Application Data

(63) Continuation of application No. 15/544,006, filed as application No. PCT/IL2016/050126 on Feb. 3, 2016, now Pat. No. 10,372,122.

(60) Provisional application No. 62/111,764, filed on Feb. 4, 2015.

(51) Int. Cl.
| | |
|---|---|
| *G05D 1/00* | (2006.01) |
| *G08G 5/00* | (2006.01) |
| *G08G 5/04* | (2006.01) |
| *H04L 12/64* | (2006.01) |

(52) U.S. Cl.
CPC ........... *G05D 1/0022* (2013.01); *G08G 5/003* (2013.01); *G08G 5/006* (2013.01); *G08G 5/0013* (2013.01); *G08G 5/0034* (2013.01); *G08G 5/0043* (2013.01); *G08G 5/0069* (2013.01); *G08G 5/0082* (2013.01); *G08G 5/045* (2013.01); *H04L 12/6418* (2013.01)

(58) Field of Classification Search
CPC .... G08G 5/045; G08G 5/0082; G08G 5/0069; G08G 5/006; G08G 5/0043; G08G 5/0034; G08G 5/0013; G08G 5/003; G05D 1/0022

See application file for complete search history.

(56) References Cited

U.S. PATENT DOCUMENTS

| | | | |
|---|---|---|---|
| 6,795,772 B2* | 9/2004 | Lin | G08G 5/0008 342/29 |
| 6,799,094 B1* | 9/2004 | Vaida | B64D 45/0015 701/3 |
| 6,820,006 B2* | 11/2004 | Patera | G08G 5/045 701/301 |

(Continued)

*Primary Examiner* — Mussa A Shaawat

(57) ABSTRACT

A flight management system for unmanned aerial vehicles (UAVs), in which the UAV is equipped for cellular fourth generation (4G) flight control. The UAV carries on-board a 4G modem, an antenna connected to the modem for providing for downlink wireless RF. A computer is connected to the modem. A 4G infrastructure to support sending via uplink and receiving via downlink from and to the UAV. The infrastructure further includes 4G base stations capable of communicating with the UAV along its flight path. An antenna in the base station is capable of supporting a downlink to the UAV. A control centre accepts navigation related data from the uplink. In addition, the control centre further includes a connection to the 4G infrastructure for obtaining downlinked data. A computer for calculating location of the UAV using navigation data as from the downlink.

15 Claims, 2 Drawing Sheets

(56) References Cited

U.S. PATENT DOCUMENTS

| | | | | | |
|---|---|---|---|---|---|
| 6,873,903 | B2* | 3/2005 | Baiada | | G08G 5/0043 340/961 |
| RE39,053 | E * | 4/2006 | Rees | | G01S 7/04 342/29 |
| 7,024,309 | B2* | 4/2006 | Doane | | G01S 13/933 701/301 |
| 7,194,353 | B1* | 3/2007 | Baldwin | | G08G 5/0013 701/528 |
| 7,212,917 | B2* | 5/2007 | Wilson, Jr. | | G05D 1/0044 340/961 |
| 7,306,187 | B2* | 12/2007 | Lavan | | B64B 1/14 244/123.11 |
| 7,492,307 | B2* | 2/2009 | Coulmeau | | G01S 13/933 342/32 |
| 7,516,014 | B2* | 4/2009 | Hammarlund | | G01S 5/0072 340/961 |
| 7,630,829 | B2* | 12/2009 | Pepitone | | G05D 1/0083 701/120 |
| 2002/0152029 | A1* | 10/2002 | Sainthuile | | G08G 5/045 701/301 |
| 2003/0122701 | A1* | 7/2003 | Tran | | G08G 5/0008 342/29 |
| 2003/0193409 | A1* | 10/2003 | Crank | | B64D 45/0056 340/970 |
| 2004/0078136 | A1* | 4/2004 | Cornell | | G01W 1/00 701/120 |
| 2004/0193362 | A1* | 9/2004 | Baiada | | G08G 5/025 701/120 |
| 2005/0156777 | A1* | 7/2005 | King | | G08G 5/0021 342/29 |
| 2006/0224318 | A1* | 10/2006 | Wilson, Jr. | | G08G 5/0052 701/469 |
| 2007/0078600 | A1* | 4/2007 | Fregene | | G08G 5/0021 701/301 |
| 2007/0150127 | A1* | 6/2007 | Wilson, Jr. | | G08G 5/0034 701/10 |
| 2010/0121574 | A1* | 5/2010 | Ariyur | | G08G 5/0069 701/301 |

* cited by examiner

FLIGHT MANAGEMENT SYSTEM FOR UAVS

CROSS-REFERENCE TO RELATED APPLICATIONS

The present application claims the benefit of priority to U.S. Provisional Patent Application Ser. No. 62/111,764, filed 4 Feb. 2015, entitled "Control And Flight Management For UAV And Multiple UAVs Flight Management And Control By 4G And Further Generations Of Cellular infrastructures And Networks." The aforementioned application is hereby incorporated herein by reference.

TECHNICAL FIELD

The present invention is in the field of aviation control. More specifically the control of unmanned aviation vehicle flight and cellular networks.

BACKGROUND ART

The usage of UAVs is growing steadily. Mission spectrum is wide and keeps widening, a typical list of missions includes: reconnaissance, military targeting and attack, fire control, and parcel delivery. Currently commercial UAVs require special wireless links to control their flight, each such link may not be geographically sufficient to cover the entire flight path, rather, it provides for a limited section of the path. Typically only a few miles are supported by the link, usually requiring line of sight to the UAV.

While the UAV typically communicates with a wireless ground stations, the human controller is connected to ground stations via a ground network. If the ground station is part of a nationwide system of control stations that coordinate with each other, there is a possibility of a smooth handover of UAV from one ground station to next. An alternative scenario is that of a controller directly communicating with the UAV via a wireless link.

An issue associated with UAV flight control, is the lack or lesser interaction of these aerial vehicles with the general flight control. The weight of UAVs is often less than 25 kgs, and for this and various other reasons their tracking by many radar system is not facilitated. This not only indicates a lack of possibility to control flight using common tracking systems but the hazard that such vehicles pose to civilian, military air traffic, other UAVs and objects on the ground through actual collision or otherwise intervention in flight courses.

DISCLOSURE OF THE INVENTION

As the bottleneck in UAV communications (uplink and downlink) is the struggle for bandwidth, it is maintained that the deployment and use of generation 4.0 (known as 4G) and above is to provide a viable data link for UAV flight path control and optionally additional tasks. 4G infrastructure is now being implemented worldwide.

Figure 1:
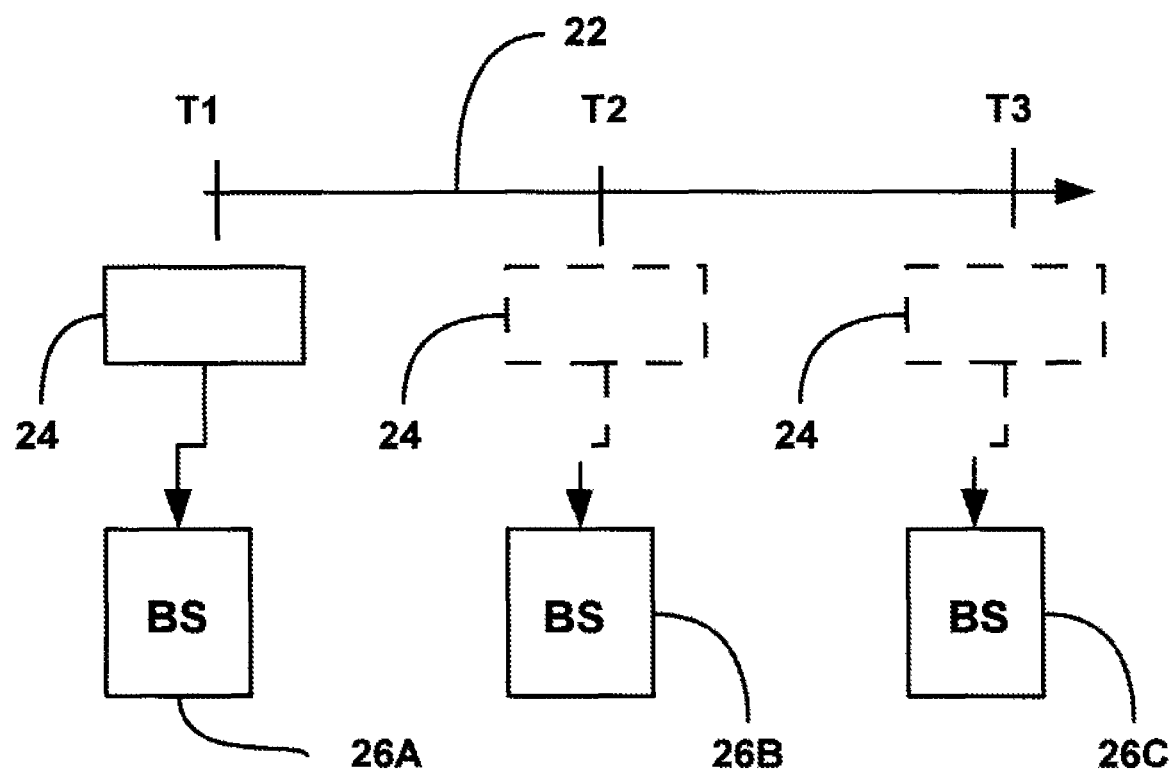
FIG. 1 is a schematic diagram of a general flight path with ground station support.

In accordance with the present invention, a UAV flies along a flight path while using the cellular 4G infrastructure to implement the mission control. As can be seen in FIG. 1, flight path 22 which also represents a time line is the path along which UAV 24 flies or is intended to fly at time T1, T2 and T3. At T1 base station (BS) 26A intercommunicates with UAV 24, at time T2 BS 26B replaces 26B and at time T3 BS 26C replaces 26B. In comparison with control system of the prior art, the BSs attending to the flight control of the UVA in accordance with the present invention, come in lieu of the customary ground stations.

Figure 2:
FIG. 2 is a schematic diagram of a UAV with data link.

The complete data path is shown schematically in FIG. 2. UAV 24 uses data link 32 to connect with flight control centre 34. The data link in accordance with the present invention is embodied in 4G infrastructure employing compatible modems on the UAV.

Minimal Network Properties Required

In order to fulfill the task in accordance with the present invention, cellular infrastructure of the $4^{th}$ generation (known also as 4G) and above is used to provide the data link to the UAV. Properties of the 4G system are defined by ITU's International Mobile Telecommunications Advanced program (IMT-Advanced program). The ITU stands for International Telecommunication Union, which is an agency of the UN.

On-Board H/W Components of a UAV Accommodated for Mission

Figure 3:
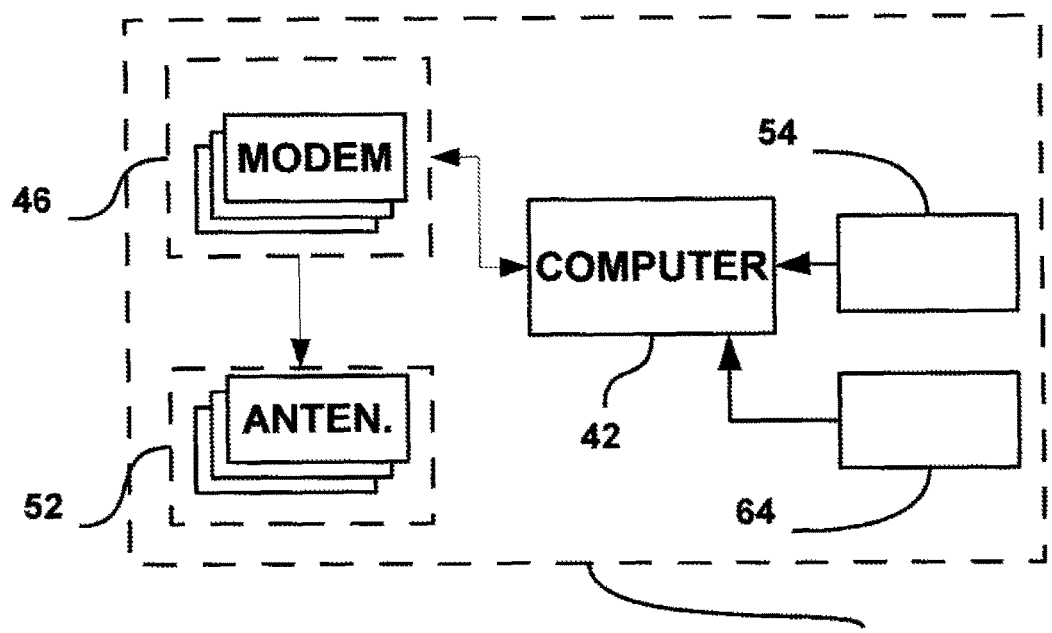
FIG. 3 is a schematic description of the major components with which a UAV for implementing the present invention is equipped.

Schematically shown in FIG. 3, UAV 40 carries on board computer 42 connected to one or more cellular modems 46, these modems are operational with 4G cellular network. An example of 4G modem is Netgear AT&T Aircard 34OU 4G USM which is an LTE (long term evolution) modem. To these one or more modems, one or more cellular antennae 52 are connected, to provide RF to the downlink and/or as uplink receiving antennae for each of the modems. Box 54 represents hardware payload elements, typically sensors that provide navigational information to be downlinked to the flight control centre. LTE advanced and Mobile Wimax communication standards are considered as complying with the 4G requirements. Navigational information derived from on-board inertial sensors (gyroscopes and accelerometers) can be used to navigate the UAV in case of a total failure of the supporting cellular network, or a failure in receiving data from the GPS satellites. Navigational information can be derived from the signal of the supporting cellular network, which may be very important if so signal from the GPS satellites is insufficient. The cellular network can identify the location of the UAV as by at least two base stations and as "triangulation" algorithm in order to provide the location of the UAV.

Providing for UAV Related Uplink and Downlink Data

In order to control the UAV in its flight path, downlink is required to send commands and flight parameters to the UAV. In the other direction, uplink data is transmitted to the control centre to provide navigation related data collected in the UAV, and which is relevant for the analysis of the compliance of the UAV with the path. Such data is for example, telemetry, GPS data collected by on-board GPS receiver and on-board inertial data, these are represented by box 54. The collected data all or part of the collected data from the sensors can be uploaded to the internet cloud as IoT (Internet of Things) data. The uplink and downlink data from or to the UAV can be sent to more than one end point. Such data as payload data as video stream that is sent from the UAV camera or data as the UAV flight parameters data can be sent to more than one end point via the 4G infrastructures to different working stations or even to personal devices as Smart phones, tablets (with 4G modems) directly or indirectly and simultaneously. In the other direction, it is possible that the driving control and flight management of the UAV can be done in parallel from different End Points of the 4G infrastructures but coordinated between the UAV remote pilots so in definite moment only one is the main UAV remote pilot that actually drives the UAV. For example more than one person can drive and control the UAV at specific time but at any moment the UAV driving control can be switched to a different person connected to different end point, receiving the same flight parameters and other payload data of the UAV simultaneously.

UAV Payload Data and Uplink for Transmitting Same

In addition to the control and flight management, another aspect of the present invention is to do with a payload uplink, specifically not associated with the data related to the flight management. The uplinked data of this category relates to another aspect of the present invention, implemented through the 4G infrastructure discussed above. Box 64 represents hardware payload elements, typically sensors that provide information to control centre 34 or to another data collecting facility. An Inconclusive list of such sensors include optionally video camera/s, thermal IR camera/s (known also as FLIR), and RADAR. Other sensors which may be of use are thermometers, pressure gages, humidity gages and other meteorological and other environmental sensors. Payload data from such sensors can be loaded to the internet cloud for various data analysis agencies while the UAV is on mission or after.

BS and On-Board Antennae

BS antennae are typically Omni-directional. However for the sake of the purpose described in the present disclosure, directional antenna can be used to point at some angle upwards.

The adaptation of the UAV to the implementation of cellular networks connectivity includes the on-board antennae as well. In order to extend the effective distance of a UAV from the cellular BS, two types of antennae can be used in a complementary manner which will be described below. The two types of antennae in this case are omni-directional antenna and unidirectional antenna.

In this aspect of the invention, the omni-directional antenna can be used to search for the strongest emitting antenna of a BS. After detection of the strongest antenna, the unidirectional antenna can be directed to the same antenna in order to acquire the signal from same antenna.

The unidirectional antenna then locks on the direction of the cellular BS antenna so the higher gain of the unidirectional antenna enables the detection of weaker signals and by that extend the UAV range from the BS.

This aspect of the invention can contribute to the quality of service (QoS) with respect to the UAV. This aspect of the invention is expected to increase the QoS in problematic locations for example where a BS is at a suboptimal distance, and in places in which BS is of poor coverage and in general where the received signal is weak.

The omni-directional antenna can continuously search for alternative BSs signals. Thus, if a signal has become weak or lost altogether, rendering the unidirectional antenna ineffective, the omni-directional antenna is switched back to keep the connection with the wireless link albeit a different BS, providing a better signal.

A Plurality of SIM (Subscriber Identity Module) Cards

In another aspect of the present invention, the one or more modems on-board the UAV may contain each one or more SIM cards. This enables the UAV to shift from one to another cellular network in order to increase the robustness of the communications system. Moreover, it becomes possible for the UAV to use a plurality of networks at once thereby increasing effective bandwidth.

Quality of Service for the UAV

Flight control traffic for UAVs over 4G, must have ensured bandwidth and network access. There are several supporting measures that can be taken in order to keep the QoS above a defined threshold. One such measure is discussed above with respect to the use of two antenna types. One other measure is discussed below in the context of an auxiliary UAV. Another measure is the implementation of a virtual mobile network, similar to the MVNO (mobile virtual network operator) also known as Molo (mobile other licensed operator), in which the infrastructure, typically BS are licensed to an operator other than the proprietor of the infrastructure. Such technological/legal operative, it would be practical to allocate a portion of the infrastructure use to a UAV operator under agreement, in which case the QoS would be more under control of the UAV operator. By definition such a virtual network operator may dedicate the network solely for the use in accordance with the present invention. Another aspect of supporting measures for the flight/mission is discussed below under the header of flight plan below.

In order to use the frequencies bandwidth optimally in the cellular infrastructures including the base stations, the system is to dynamically allocate the bandwidth of the cellular network and its base station. For example if there is a demand for additional bandwidth for confirmed UAVs flight plans, more of the frequencies bandwidth will be dedicated for the UAVs network with a lesser frequencies bandwidth being allocated for the primarily mobile phone wireless network. Such a dynamic allocation of the frequencies bandwidth can be managed as by the cellular infrastructures management system.

Participation of More than One UAV in a Mission

In addition to the UAV carrying out a certain mission, other UAV/s may be involved in the same mission. An auxiliary UAV (AUAV) may be employed to extend the cellular network participating in the mission. For example, a AUAV can carry on-board the amount of H/W required for creating a microcell, the AUAV may assist in the UAV providing the mission, to extend geographical limitations of the cellular system interacting with the UAV, or in keeping a QoS definitions in control, essentially as the microcell created by the AUAV is to serve the UAV exclusively. The notion of picocel in this context is theoretically possible but then the two UAVs will have to keep very close in order so for the connections to take place.

Flight Plan

Since this term has formal connotations, as a formal plan presented to the flight control authorities by the flier of a plane, the term is used hereinafter in a more loose sense than is usually used in the context of flight formalities. Thus, the intended course of a mission, from a geographical point of view of a UAV in accordance with the present invention, draws a geographically based scheme of flight in all three dimensional aspects of the space. The flight plan in accordance with the present invention takes into consideration not only the course of the planned mission in geographical coordinates and flight altitude along the route, but also the availability of BSs along the routes, service providers deployed along the proposed plan, and alternatives. In such a plan, the possibility of employing an AUAV for specific sections of the plan is state in order to increase extent of service, overcome blockage or reduction in reception quality of the cellular network, etc. The consequences of the flight plan on the QoS are such that on sections of the flight plan there may be more BSs available, then in other sections. The availability of more than one cellular infrastructure along the path, may be used to prefer a specific service provider along the way, thereby switching between SIM cards available on-board the UAV, either applying a preplanned move or by an on flight decision. Further, different bandwidth requirements along the flight path may be planned ahead and be integrated in the flight plan. For example if the flight plan includes a video acquisition term from one point to another point, the bandwidth for the downlink at the specific limits is to cover the bandwidth allocation requirements at the stage.

The system may confirm the requested flight course after confirming and consider the local flight authorities regulations requested by the submitted the flight program according to the regulations and other UAVs expected and confirmed flights and after checking and verifying that the flight requested program is in allowed airspaces.

The confirmed flight plan and path in the 3D space and time can be downloaded by the 4G downlink to the UAV to be accepted by the on-board computer for further processing to control the UAV flight. This can be managed by the FDCDS (discussed below) as well. The flight control according to the downloaded flight plan can be then achieved for example by an on-board autopilot or by the remote pilot which may be a person who drives remotely the UAV.

Implementation of the current invention can increase safety of flight for large number of simultaneously flying UAVs, as well as for human life and safety of property on the ground since the availability of the UAVs flight parameters via the same payload wireless link implemented by the 4G cellular modem and link and the relatively easy addition capability of supervising and control of the UAVs that is proposed by the current concept and invention. There is no known current wireless network that is especially advantageous and able to support all the benefits as can be provided by the implementation of the current invention.

Figure 4:
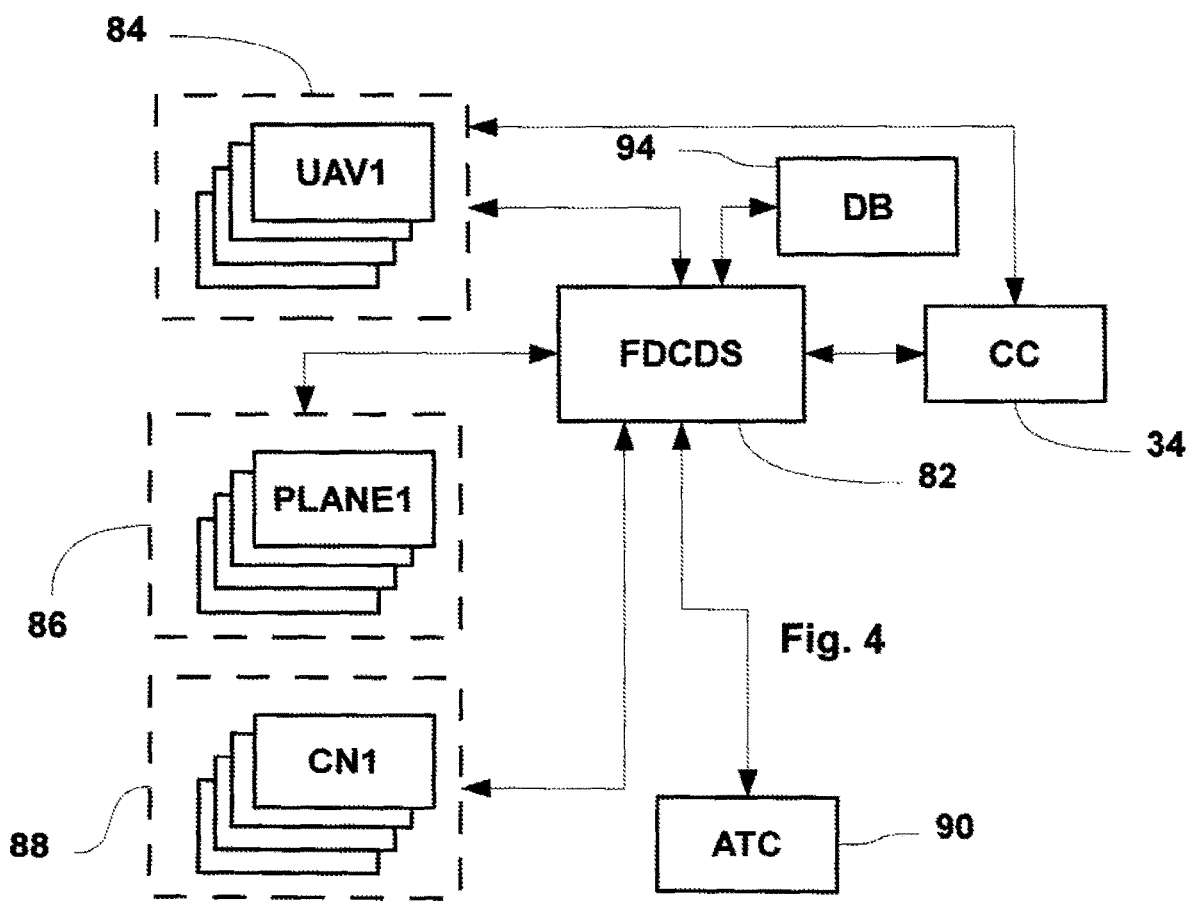
FIG. 4 is a schematic diagram showing the interconnection of a flight data collection and distribution server.

A flight data collection and distribution server (FDCDS) constitutes another aspect of the invention. The data sources and distribution targets of the server, are described schematically with reference to FIG. 4. FDCDS 82 interacts with subscribing UAVs 84, with subscribing air planes 86, with participation 4G cellular providers 88 and with aerial traffic control authorities (ATC) 90. The interaction with the UAVs 84, aero planes 86 and cellular network providers has a strong on-line aspect as they may be involved with on-going missions. The involvement with control centre 34 and ATC 90 has more off-line aspects. The purpose of having an active FDCDS is to monitor struggle over bandwidth, facilitate better planning of flight missions and prevent collisions. The FDCDS can be used as a major tool in the implementation of aerial flight control. The data about flight missions of UAVs, stored and constantly updated in database 94 can be used as a planning tool to select best flight plans. In case the FDCDS detects that a UAV is out of its confirmed flight path, in the 3 dimensional space, the FDCDS can assume control thereby setting the UAV in the original flight path. The FDCDS can also confirm or reject request for flight plan. In case the flight plan is confirmed by the FDCDS, the FDCDS can download to the UAV the confirmed flight plan and flight path including the 3D path, and reference to time. The flight plan may be downloaded by the 4G structure downlink to the on-board computer. Alternatively the UAV may receive just a confirmation number if the flight plan is already downloaded.

In a similar attitude to various levels of autopilot controlling flight parameters, the FDCDS can in cooperation with on-board computer 42 can assume control of rudder, ailerons, elevators, and the engine. Another practical option is the use of a standard purchased autopilot unit so the driving control data for the flight driving control channels as for the rudder, ailerons, elevators, and the engine. The connection of the cellular modem to such autopilot unit can enable stable and accurate flight track in various weather conditions. The flight driving control channel between the cellular modem mounted in the UAV can interface and/or use standard protocols for remote control for platforms as standard S.BUS serial data protocol or any other standard serial data wireless link protocol for remote control of platforms.

Other Autonomous Vehicles.

Although the disclosure referred to hereinabove to UAVs, it should be understood that the system of the invention can be applied to other autonomous vehicles, more specifically to autonomous land vehicles and autonomous boats. With the exception that there is usually no need to implement altitude references in earth-bound missions, or at least much less in so term of altitude is to take place.

Use of the System of the Invention in the Managing of UAV Fleets.

The idea of using fleets of UAVs in regular haulage and dispatch missions is gaining momentum and is expected to become prevalent. The FDCDS of the present invention lends itself easily to managing such fleets together with keeping track of the consignments. The use of data relating to the flight missions obtained from a plurality of UAVs and using data from other sources such as weather models, facilitates the dynamic assignment of flight plans that can provide minimal dispatching time of parcels by UAVs of the fleets. Moreover, such plans can be dynamically calculated in-flight for optimization.

Integrative Computer on Board the UAV

As mentioned already above, computer 42 is connected to the modems and does its share in the communications of the UAV the cellular infrastructure. In addition, the same computer can be employed in the task of maneuvering the UAV by controlling the motors of the devices that direct the flight (ailerons etc.) and also it can control the power output of the propulsion engine to change the thrust, for example by controlling the fuel supply. The same computer can be implemented in the control of the various sensors including cameras on-board the UVA.

Flight Supervision

The supervision, control and management of flight in accordance with the present invention, preferably uses the FDCDS 82, may track each flight since location speed and other navigation data can become available if it is connected via the same cellular infrastructure then in case of out of course. The system can prevent deviation from an authorized course by sending limitation commands to the UAV specifically in case of risks of entrance to forbidden airspaces. To perform such supervision, automatic or non automatic, use is made of UAV telemetry and flight parameters such air and ground speed, altitude, measured on board the UAV, location by GPS and other flight parameters. The UAV uplink data sent via the 4G infrastructures may include also relevant information as left fuel or left electrical energy in the battery of the UAV in order to enable efficient and safe UAV flights.

In case of risk of physical danger to a supervised UAV that may caused by another UAV, the system can alert about the risk by sending flight driving commands in order to prevent the contention, automatically or by the human operator of the UAV or by the UAVs flight supervision and control system.

A new flight plan can be requested and confirmed during other flight plan as when there is a need to change the flight course during flight. Such supervision and control may enable in real time priority for UAVs that are in a mission of emergency services by sending alerts and other flight instructions in real time to other UAVs. Such supervision and control system may increase safety in the air and on the ground and can enable automatic by computerized and/or by human supervision as well while supplying and recording of each UAV flight details including location, speed, height, direction and other vital flight data.

The invention claimed is:

1. A system for flight management and communication for a plurality of simultaneously flying unmanned aerial vehicles (UAVs), based on a cellular communication protocol of 4G or further generation, comprising:
a base station capable of communicating with said plurality of UAVs along their flight paths;
at least one ground antenna in said at least one base station capable of supporting an uplink, downlink, or both to said plurality of UAVs;
a control center to accept navigation related data from said downlink, said at least one control center further including at least;
a connection to said infrastructure for obtaining downlink and uplink data;
a computer, tablet, or smartphone for calculating location of at least one of said plurality of UAVs using at least data from said downlink and/or uplink;
a connection to said infrastructure or to a communication network for providing uplink and downlink; and
at least one flight data collection and distribution server (FDCDS) for collecting data from said plurality of UAVs, from at least one supporting cellular network of said protocol, and from air traffic control authorities, wherein said FDCDS also distributes data for users who are involved in at least planning of flight missions; said collecting data from said air traffic control authorities is performed on line, offline, or both on line and offline;
wherein said FDCDS is further configured to confirm or reject a requested flight plan according to:
flight authority regulations;
flights of other UAVs, based on said data from said plurality of UAVs collected by said FDCDS; and
verification said requested flight plan is in allowed airspaces;
wherein said FDCDS is further configured to alert at least one of said plurality of UAVs of a danger of contention with another of said plurality of UAVs;
wherein said system further comprises a dedicated virtual network within said infrastructure; and
wherein said dedicated virtual network is configured to provide a deterministic QoS to said plurality of UAVs.

2. The flight management and communication system as in claim 1, comprising:
at least one or a plurality of simultaneously flying UAVs equipped for flight control based on said protocol, said UAVs each carrying on board:
at least one modem of said protocol;
at least one on-board antenna connected to said at least one modem for providing uplink, downlink, or both uplink and downlink wireless RF to a network of said protocol;
a computer connected to said modem and to flight controls or an autopilot of said UAV.

3. The flight management and communication system as in claim 2, wherein said FDCDS assumes control over flight of said plurality of UAVs.

4. The flight management and communication system as in claim 2, wherein said UAV further comprises at least one sensor and wherein output data of said sensor is transmitted via said downlink and said infrastructure to said control center or said FDCDS, and wherein said output data of said sensor is not associated with said flight management.

5. The flight management and communication system as in claim 2, wherein said base station dynamically allocates bandwidth for transfer of sensor data collected from said plurality of UAVs, and said control center or FDCDS as requested and confirmed in the flight plan.

6. The flight management and communication system as in claim 2, wherein said computer is an integrative computer, is connected to said at least one sensor, and further performs the following functions:
directs maneuvers of said plurality of UAVs by controlling actuators of the flight control and thrust of the propulsion engine; and controls the sensors.

7. The flight management and communication system as in claim 2, wherein data transfer promised latency between said control center and said plurality of UAVs is low at least according to a standard of said protocol.

8. The flight management and communication system as in claim 2, wherein said plurality of UAVs each comprise a standard data and interface S.BUS serial protocol or other protocol for operation of autopilot, control actuators, or both.

9. The flight management and communication system as in claim 2, wherein said plurality of UAVs belong to an IoT network.

10. The flight management and communication system as in claim 2, wherein either one or both of said UAV and ground communication base station comprises at least one unidirectional antenna.

11. The flight management and communication system as in claim 2, further comprising an auxiliary UAV, wherein said auxiliary UAV is configured for providing a repeater or as microcells for said plurality of UAVs.

12. The flight management and communication system as in claim 2, wherein said system is further configured to dynamically allocate bandwidth of said infrastructure among said dedicated virtual network, increasing or decreasing bandwidth as needed according bandwidth demand of said plurality of UAVs; and a public cellular network of said infrastructure.

13. The flight management and communication system as in claim 12, wherein said dynamic allocating of bandwidth is managed by said infrastructure according to said protocol.

14. A system for flight management and communication for at least one or plurality of unmanned aerial vehicles (UAVs), based on wireless downlink and uplink communication protocol as cellular communication protocol of 4G or further generation, comprising:
at least one computer as control center to accept navigation related data from one or more UAV via the said communication protocol, and the said computer control center configured to calculate flight data of a UAV including at least one of location, speed, height, direction and other vital flight data wherein;

said computer control center further configured to do at least one or partial of the following:

verify a submitted flight plan that it is in allowed airspaces as according to flight authority regulations and no contention with other UAVs;

send the result of said checking as confirmation or rejection of requested flight plan; and specify a reason for rejection of a preplanned and proposal of an alternative flight plan;

confirm or reject a submitted flight plan;

specify a reason for rejection of a preplanned and propose of an alternative flight plan;

store confirmed flight path parameters with flight information (flight ID details);

implement a deterministic quality of service (QoS);

compare and supervise the said flight data parameters with actual vehicle flight parameters;

record of actual flight data including time date;

processing the actual flight path data for checking of no contention with other vehicles or entrance into non allowed spaces;

distribute at least one alert to at least one of said plurality of UAVs as of a danger of collisions with another of said plurality of UAVs or other objects on the ground or other intervention in flight courses;

distribute at least one alert to civilian or military as of a hazard that such vehicles pose as of collisions with another object or otherwise intervention in flight courses;

take control of a UAV as for correcting the flight path as in case of deviation from a confirmed flight plan or in case of other restrictions;

take control of a UAV as correcting the flight path as for preventing collision and damages to other UAV or to other objects;

take control of a UAV as correcting the flight path as according to weather conditions;

request for flight path data selected from the group: a flight path, altitude, speed, and bandwidth allocation at a specific time/date; said requesting made by said plurality of UAVs while located at any part of their flight path or flight space;

change requests of submitted flight plan to said control center and confirmation or reject on the fly during the flight.

15. A method for flight management and communication for at least one or plurality of unmanned aerial vehicles (UAVs) based on wireless downlink and uplink communication protocol as cellular communication protocol of 4G or further generation, comprising:

at least one computer as control center to accept navigation related data from one or more UAV via the said communication protocol, and the said computer control center configured to calculate flight data of a UAV including at least one of location, speed, height, direction and other vital flight data wherein;

said computer control center is further configured to perform at least one or partial of the following steps:

verifying a submitted flight plan that it is in allowed airspaces as according to flight authority regulations and no contention with other UAVs;

sending the result of said checking as confirmation or rejection of requested flight plan;

confirmation or reject a submitted flight plan;

specifying a reason for rejection of a preplanned and proposal of an alternative flight plan;

storing confirmed flight path parameters with flight information (flight ID details);

implementing a deterministic quality of service (QoS);

comparing and supervising said flight data parameters with actual vehicle flight parameters;

the method further comprises the step of:

providing a dedicated virtual network within an infrastructure of said protocol, thereby assuring said deterministic QoS to said plurality of UAVs;

recording of actual flight data including time date;

processing the requested flight path data for checking of no contention with other vehicles or entrance into non allowed spaces;

distribution of at least one alert to at least one of said plurality of UAVs as of a danger of collisions with another of said plurality of UAVs or other objects on the ground or otherwise intervention in flight courses;

distribution of at least one alert to civilian or military as of a hazard that such vehicles pose as of collisions with another object or otherwise intervention in flight courses;

taking control of a UAV as for correcting the flight path as in case of deviation from a confirmed flight plan or in case of other restrictions;

taking control of a UAV as correcting the flight path as for preventing collision and damages to other UAV or to other objects;

taking control of a UAV as correcting the flight path as according to weather conditions;

taking control of a UAV as correcting the flight path as according to weather conditions;

requesting flight path data selected from the group: a flight path, altitude, speed, and bandwidth allocation at a specific time/date; said requesting made by said plurality of UAVs while located at any part of their flight path or flight space.

* * * * *